United States Patent [19] | [11] 4,087,958
Ebihara et al. | [45] May 9, 1978

[54] TIMEPIECE APPARATUS

[75] Inventors: Heihachiro Ebihara; Misao Uchino, both of Tokorozawa, Japan

[73] Assignee: Citizen Watch Company, Limited, Tokyo, Japan

[21] Appl. No.: 761,957

[22] Filed: Jan. 24, 1977

[30] Foreign Application Priority Data

Jan. 22, 1976 Japan .................................... 51-6236

[51] Int. Cl.[2] ...................... G04C 13/02; G04C 13/04; H04B 1/02; H05B 39/09

[52] U.S. Cl. ...................................... 58/25; 58/24 R; 325/58; 340/336

[58] Field of Search ...................................... 58/24–26, 58/35 W, 50 R; 325/58; 358/93; 340/324 AD, 336

[56] References Cited

U.S. PATENT DOCUMENTS

| | | | |
|---|---|---|---|
| 2,188,145 | 1/1940 | Frantz | 358/93 |
| 2,671,131 | 3/1954 | Johnson | 358/93 |
| 3,681,914 | 8/1972 | Loewengart | 58/24 R |
| 3,746,991 | 7/1973 | Gautney | 325/58 |
| 3,811,265 | 5/1974 | Cater | 58/25 |
| 3,921,161 | 11/1975 | Baer | 340/324 AD |

*Primary Examiner*—Edith S. Jackmon
*Attorney, Agent, or Firm*—Sherman & Shalloway

[57] ABSTRACT

A novel timepiece apparatus for transmitting segment video signals to display time information etc. on a television set is described. The timepiece apparatus includes an oscillator generating a time base signal, a frequency divider dividing the frequency of said time base signal, a time counter counting an output from said frequency divider, a decoder decoding an output from said time counter, a segment video signal generator controlled by means of said decoder, a synchronizing signal generator delivering a synchrionizing signal to said segment video signal generator, a modulator receiving a segment video signal from said segment video signal generator and a synchronizing signal from said synchronizing signal generator, a carrier wave generator delivering a carrier wave to be modulated by said modulator, and a transmitter transmitting a modulated carrier wave from said modulator whereby there can be obtained precise time information etc. on television sets.

10 Claims, 16 Drawing Figures

TIMEPIECE APPARATUS

BACKGROUND OF THE INVENTION

This invention relates to a timepiece apparatus which transmits segment video signals to display time information or other information marks on a television set.

DESCRIPTION OF THE PRIOR ART

Heretofore, a video time information on a television set has been effected only for a limited time since a scene of a television becomes hard to see when the time information is displayed in the scene. Further, it is not determined to display a time information at a predetermined time. Therefore, one has to obtain a service of time announcement by a telephone in order to know precise real time. However, this is very troublesome to busy men.

SUMMARY OF THE INVENTION

An object of this invention is to provide a timepiece apparatus for eliminating the above-described defects in the conventional apparatus.

Another object of this invention is to provide a timepiece apparatus which transmits segment video signals to a television set so as to display a time information in the scene of the television set.

A still further object of this invention is to provide a timepiece apparatus which transmits a signal for a selected mark together with segment video signals to a television set so as to display other information in addition to the time information in the scene of the television set.

DESCRIPTION OF THE PREFERRED EMBODIMENTS

Figure 1:
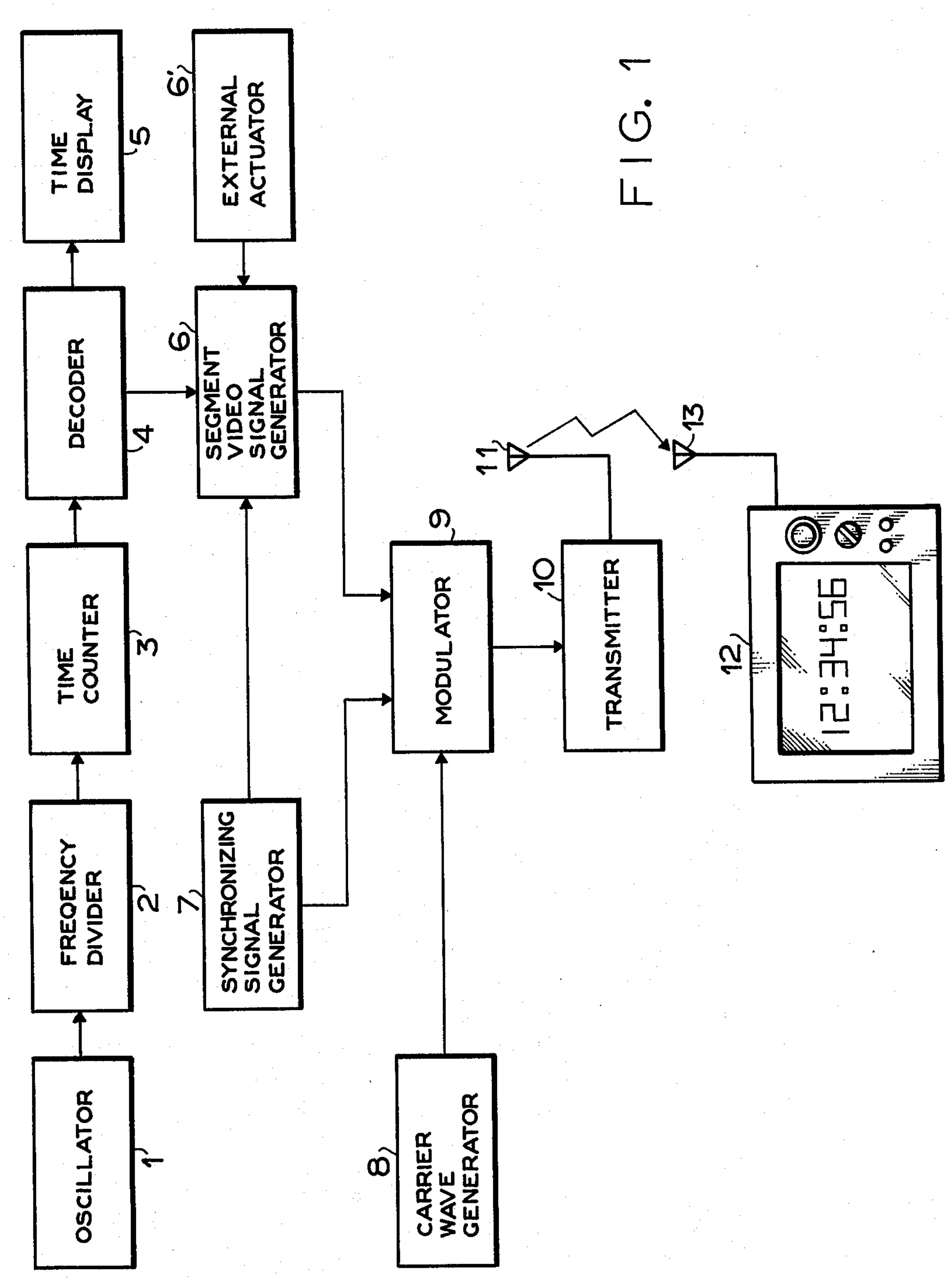
FIG. 1 is a block diagram showing one embodiment of a timepiece apparatus according to this invention.

This invention will now be described with reference to the accompanying drawings. FIG. 1 is a block diagram showing a timepiece apparatus of this invention in which reference numeral 1 depicts a highly precise oscillator as a time base, of which the output signal is applied to a frequency divider 2 and a second output from the frequency divider 2 is delivred to a time counter 3. The content of the time counter 3 is decoded by means of a decoder 4 so as to be delivered to a time display 5 and as the result, the time display digitally shows the hours, minutes and seconds at that time. This is a common system in an ordinary timepiece.

A timepiece apparatus of this invention includes the above structure and further comprises a segment video generator 6 driven by a synchronizing signal generator 7 and controlled by the content of the decoder 4, a modulator 9 modulating the output from a carrier wave generator 8 by means of the outputs from the synchronizing signal generator 7 and the segment video generator 6 and a transmitter 10 transmitting the modulated carrier wave output. Reference numeral 11 illustrates an antenna.

Electric waves transmitted from the antenna 11 are received by a receiving antenna 13 provided on a television set 12 and thereby the content of the time counter 3 being digitally displayed on the scene of the television set 12.

Figure 2:
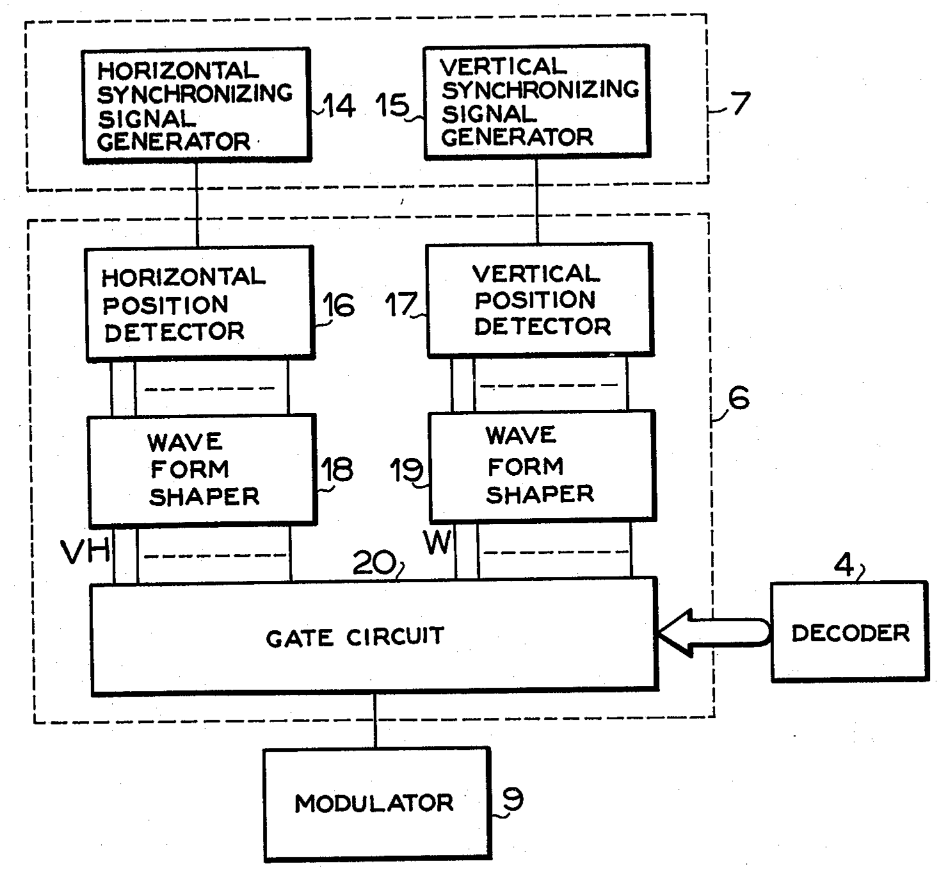
FIG. 2 is a block diagram showing one embodiment of a segment video signal generator in FIG. 1.

Hereinafter, there will be described in detail means for generating segment video signals. As shown in FIG. 2, the synchronizing signal generator 7 is composed of a horizontal synchronizing signal generator 14 and a vertical synchronizing signal generator 15. The horizontal synchronizing signal generator 16 monitors a position in the horizontal direction of the scanning line with making a horizontal synchronizing signal as the reference and generates a signal every starting point at the horizontal position of each segment. A wave form shaper 18 serves to shape a signal for forming the width in the horizontal direction to the figure every segment on the basis of each segment starting point signal formed by the horizontal position detector 16.

Referring to the vertical direction, there is effected the same operation as that of the horizontal direction by means of a vertical synchronizing signal generator 15, a vertical position detector 17 and a wave form shaper 19.

Figure 3A:
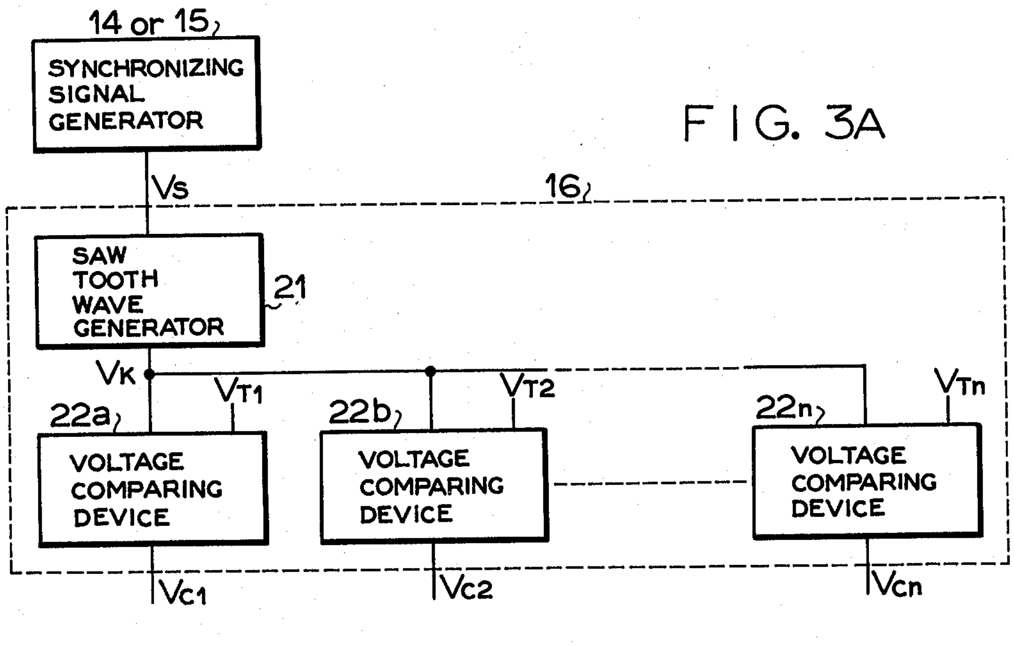
FIG. 3A is a block diagram showing one embodiment of a horizontal position detector in FIG. 2.
Figure 3B:
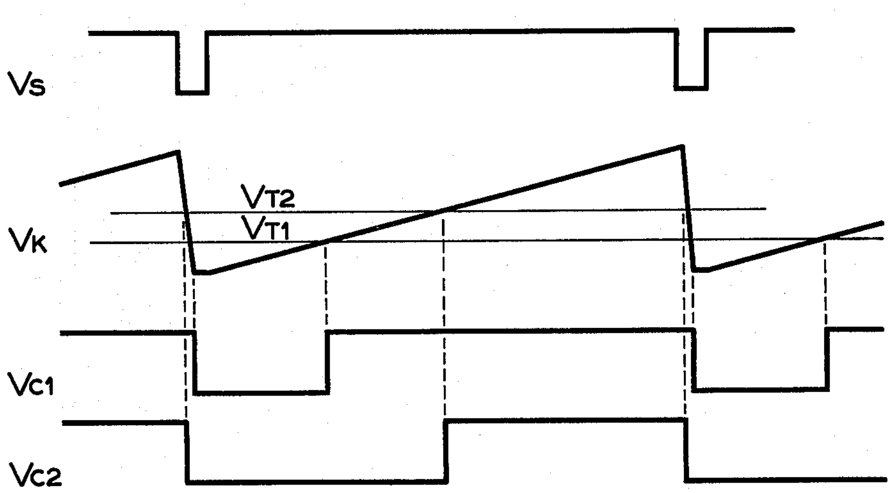
FIG. 3B is wave forms of the horizontal position detector as shown in FIG. 3A.

In FIGS. 3A and 3B shown is a detailed embodiment of a horizontal position detector 16. A tooth shape wave generator 21 is driven by a synchronizing signal $V_S$ and the output rises toward high voltage progressively. The output $V_K$ is applied to voltage comparison device 22*a*, 22*b* . . . 22*n* having different threshold voltage values $V_{T1}$, $V_{T2}$, . . . . $V_{Tn}$ respectively. Thus, the comparing device 22*a* delivers a high potential (hereinafter called as "H") to the output $V_{c1}$ when the tooth shape wave $V_K$ reaches $V_{T1}$. When the output $V_K$ reaches $V_{T2}$, the output of the voltage comparing device 22*b* becomes "H". Similarly, the point where the outputs $V_{c1}$, $V_{c2}$, . . . . $V_{cn}$ change from a low potential (hereinafter called as "L") to "H" is made as a starting point of each segment corresponding thereto.

Figure 4A:
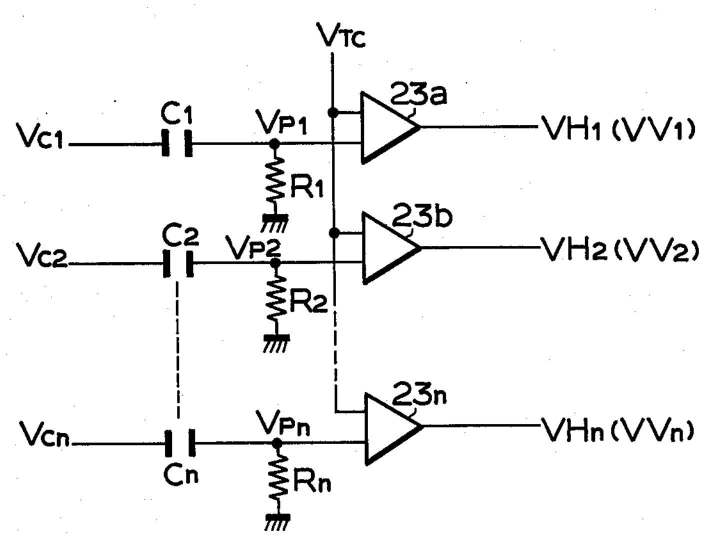
FIG. 4A is a circuit diagram showing one embodiment of a wave form shaping device in FIG. 2.
Figure 4B:
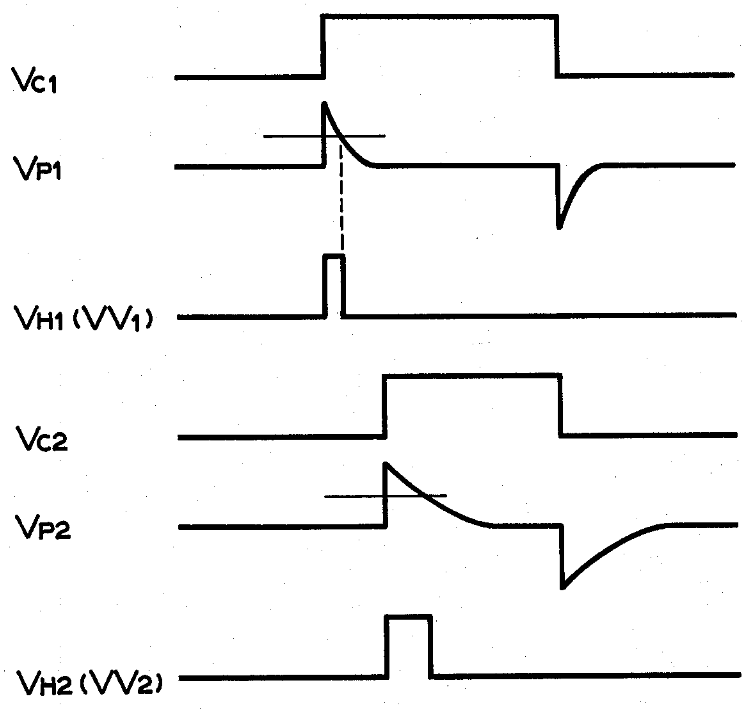
FIG. 4B is wave forms of the wave form shaping device in FIG. 4A.

In FIGS. 4A and 4B shown is a detailed embodiment of the wave form shaper. The outputs $V_{c1}$, $V_{c2}$, . . . $V_{cn}$ from the detector are applied to the voltage comparing devices 23*a*, 23*b*, . . . 23*n* through the corresponding capacitors $C_1, C_2, \ldots C_n$ and are simultaneously directed through the resistors $R_1, R_2, \ldots R_3$ to the earth. The equivalent voltages are applied to the voltage comparing devices 23*a*, 23*b*, . . . 23*n*.

As obviously understood from the operating wave forms shown in FIG. 4B the outputs $V_{c1}, V_{c2}, \ldots V_{cn}$ are differentiated by the capacitors $C_1, C_2, \ldots C_n$ and the resistors $R_1, R_2, \ldots R_n$ so that a spike shaped wave form may be applied to the voltage comparing devices. The output from the voltage comparing device is "H" only while the spike shaped wave form exceeds the comparison voltage $V_T$. If the time constant determined by the capacitor and resistor is changed, the pulse width to be obtained may be varied. Of course, the same effect can be also obtained by varying the comparison voltage under the definite time constant.

Figure 7:
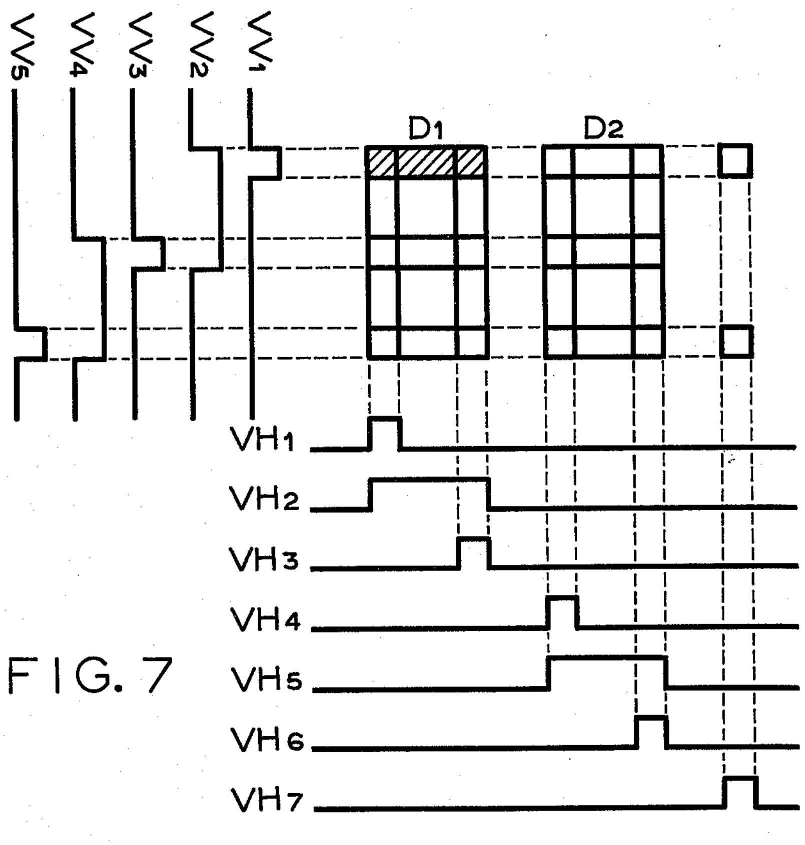
FIG. 7 is a schematic view showing the relationship between each segment and the outputs from a wave shaping device in the horizontal and vertical directions.

FIG. 7 shows the outputs from the wave form shapers 18, 19. Signals $V_{H1}$ through $V_{H7}$ define the segment positions in the horizontal position and $V_{V1}$ through $V_{V5}$ designate the segment position in the vertical position. For example, the segment illustrated by oblique lines in FIG. 7 is designated by coincidence of the signals $V_{V1}$ and $V_{H2}$.

Figure 5A:
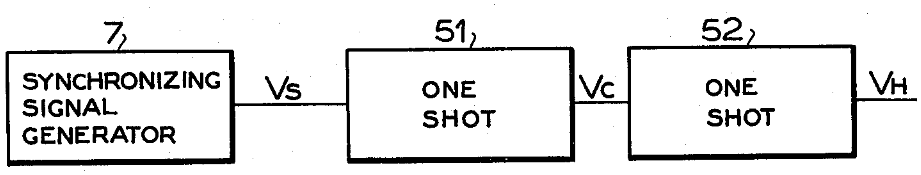
FIG. 5A is a block diagram showing another embodiment of a segment video signal generator in FIG. 1.
Figure 5B:
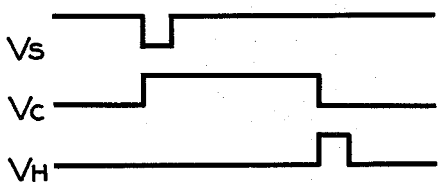
FIG. 5B is wave forms of the segment video signal generator in FIG. 5A.
Figure 6A:
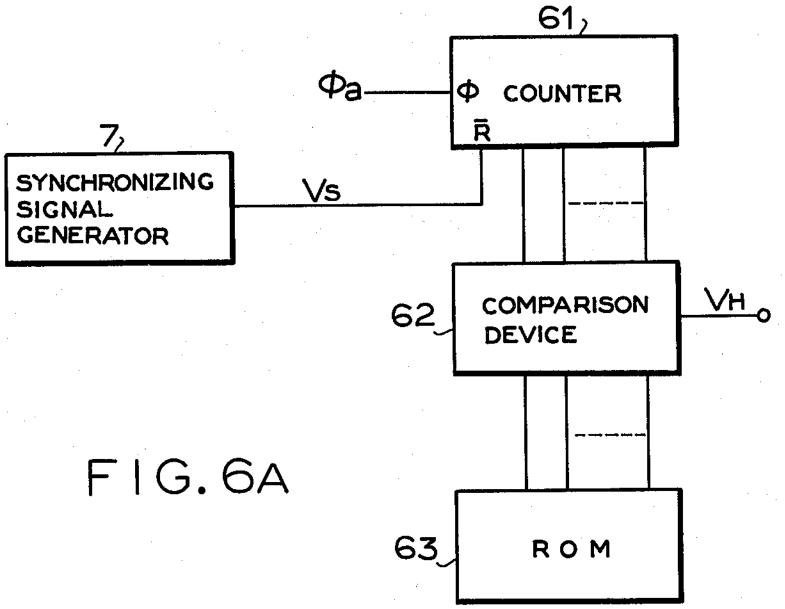
FIG. 6A is a block diagram showing other embodiment of a segment video signal generator in FIG. 1.
Figure 6B:
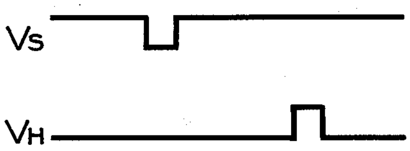
FIG. 6B is wave forms of the segment video signal generator in FIG. 6A.

The segment video signal generator 6 also may comprise one shot multivibrator circuit as shown in FIG. 5A or a counter circuit as shown in FIG. 6B in addition to the embodiments of FIGS. 3 and 4. In FIG. 5A, the output $V_S$ from the synchronizing signal generator 7 is delivered to a one shot multivibrator 51 which delivers the output $V_c$ to the next one shot multivibrator 52 which delivers the output VH. The output wave forms of the respective elements in FIG. 5A are shown in FIG. 5B.

FIG. 6A shows another embodiment of the segment video signal generator, which comprises a counter circuit wherein the output $V_S$ from the synchronizing signal generator 7 is delivered to a counter 61 which receives another input signal $\phi a$ and is connected through a comparing device 62 to a read only memory 63. The wave forms of the outputs $V_S$ and $V_H$ are shown in FIG. 6B.

Figure 8:
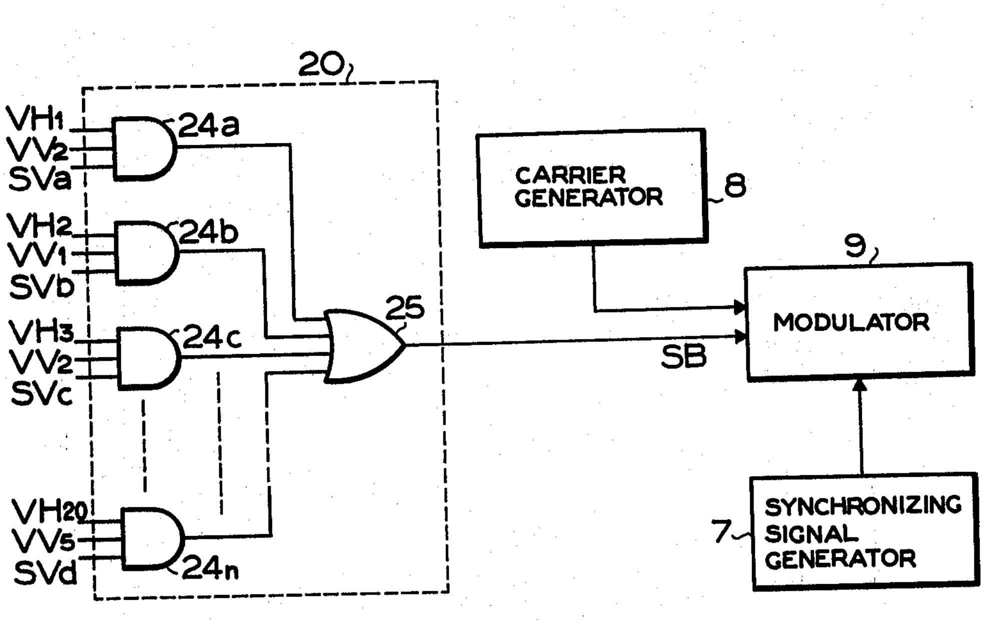
FIG. 8 is a block diagram showing one embodiment of a gate circuit in FIG. 2.
Figure 9:
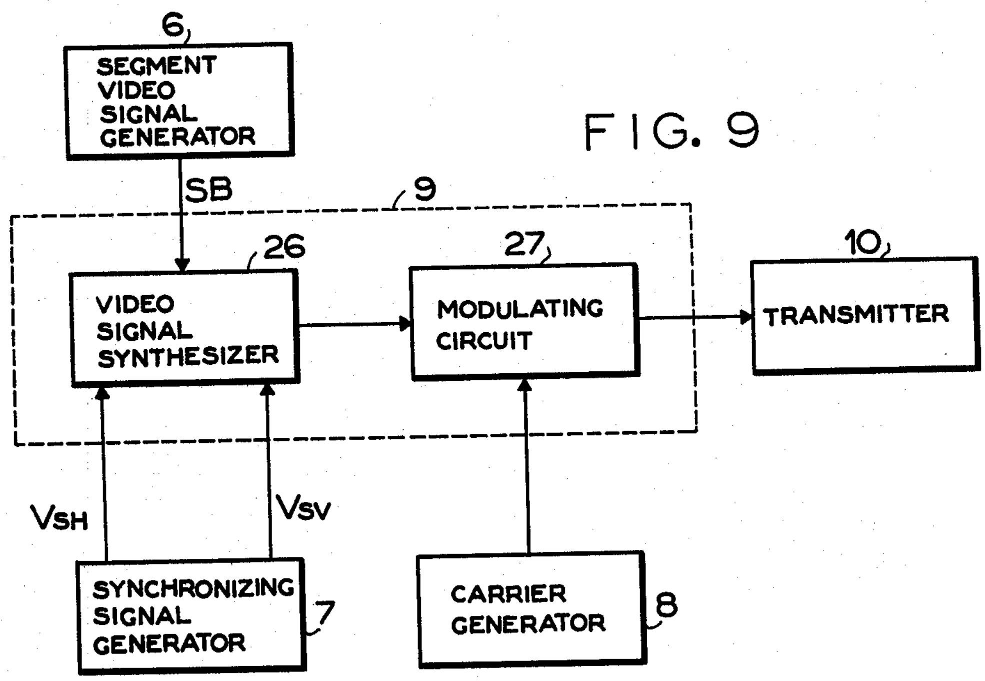
FIG. 9 is a block diagram showing one embodiment of a modulator in FIG. 1.
Figure 10:
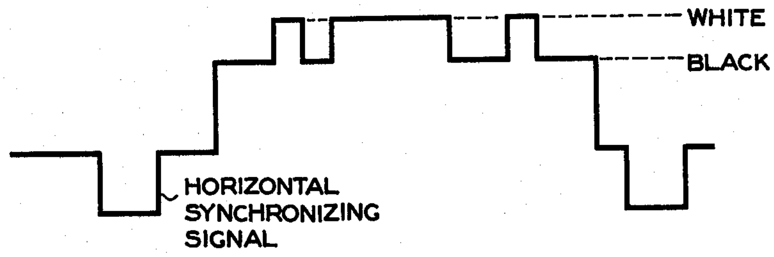
FIG. 10 is a synthesized video signal wave form.

FIG. 8 shows the structure of a gate circuit 20 as shown in FIG. 2. To AND gates 24*a*, 24*b*, . . . 24*n* with the respective three inputs, there is delivered a set of any of the horizontal position signals $V_{H1}, V_{H2}, \ldots V_{Hn}$, any of the vertical position signals $V_{V1}, V_{V2}, \ldots V_{Vn}$ and any of the signals $S_{Va}, S_{Vb}, \ldots S_{Vn}$ from the decoder 4 for designating whether the corresponding segment have to be energized or not. When all the signals $V_H$, $V_V$ and $S_V$ are "H", the output from the corresponding AND gate becomes "H" so that the output from OR gate 25 having a plurality of inputs becomes "H". The output from the OR gate 25 is delivered to the modulator 9 together with the outputs from the carrier generator 8 and synchronizing signal generator 7. The modulator 9 is composed of a video signal synthesizer 26 and a modulating circuit 27 as shown in FIG. 9. The video signal synthesizer 26 synthesizes the video signals as shown in FIG. 10 by using the synchronizing signal and the segment video signal. The modulating circuit 27 modulates the carrier by the video signal so as to deliver the modulated signal to the transmitter 10 which transmits the modulated carrier from the antenna 11. When the television set 12 receives the modulated carrier through an antenna 13, the content of the time counter 3 is digitally displayed on the scene of the television set 12. It may be possible that a white figure is displayed on the black background or that a black figure is displayed on the white background. It is preferable that the frequency of the carrier is that of UHF band, but it may be that of VHF band. However, the frequency of the carrier has to be of a frequency in which a television broadcasting is not made.

The embodiment of FIG. 1 shows the time display of 12 hours, 34 minutes, 56 seconds. The display may be year, month, date and the day of the week in addition to the above time display.

Figure 11:
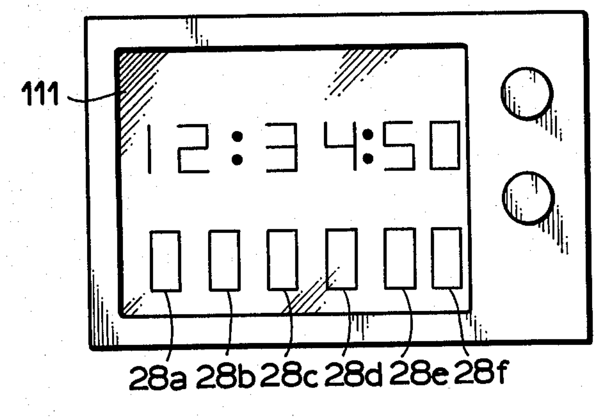
FIG. 11 is a front view of a television set wherein displayed are the time information and other informations by means of the timepiece apparatus of this invention.

FIG. 11 shows an embodiment in which shown are shown marks 28*a* through 28*f* other than the time information display 111. The control of the marks 28*a* through 28*f* is effected by means of a switch or switches externally operable on the timepiece apparatus. For example, in case that these marks mean the presence or absence of each person, each mark is lightened or eliminated on the scene of the timepiece apparatus by turning on or off the switch corresponding to the mark of each person and as the result, other person can be aware of the presence or absence of other persons by means of a television set. These marks may mean "occupied bathroom", "occuplied toilet", "telephone in operation", etc. or "main office", "business", "factory", "going out for a short time", etc. The content which a mark means may be determined at will by users. Of course, the mechanism is not required to be associated with a timepiece mechanism and may be a device independent thereof.

Figure 12:
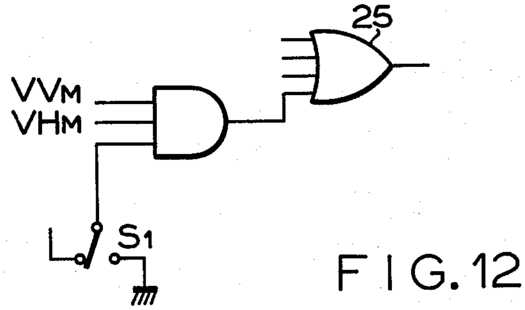
FIG. 12 is a part of a circuit embodying the scene of a television set in FIG. 11.

It is possible to display a mark at a suitable position on the scene of the television set by the same method as that of displaying time information with a segment video signal. There is effected the presence or absence of the mark display on the scene of the television set by an externally actuating member 6'. This mark display can be attained by a circuit shown in FIG. 12. When there is $V_{Vm}$, a vertical position signal corresponding to one of marks and there is $V_{Hm}$, a horizontal position signal thereto, the OR gate 21 receives a further output from another AND gate as shown in FIG. 12.

The effects of the invention are as follows: A dial of a television set is set to a time display channel adjusted to a vacant channel of the television set so that a highly precise time information may be always obtained. Television sets have been widely used and there are many cases that each room has at least one television set. And this tendency will be increased from now on. In this case, one timepiece apparatus of this invention is equivalent to the presence of each highly precise time base in each room.

In addition, the timepiece apparatus of this invention enables it that the information mark except time information display is effected on the scene of a television set together with the time information.

Of course, the timepiece apparatus of this invention may be adapted to a color television system.

The invention has been described in detail with particular reference to certain preferred emobodiments thereof, but it will be understood that variations and modifications can be effected within the spirit and scope of the invention.

What is claimed is:

1. A timepiece apparatus for transmitting segment video signal comprising:

(1) an oscillator generating a time base signal, (2) a frequency divider dividing the frequency of said time base signal, (3) a time counter counting an output from said frequency divider, (4) a decoder decoding an output from said time counter, (5) a segment video signal generator controlled by means of said decoder, (6) a synchronizing signal generator delivering a synchronizing signal to said segment video signal generator, (7) a modulator receiving a segment video signal from said segment video signal generator and a synchronizing signal from said synchronizing signal generator, (8) a carrier wave generator delivering a carrier wave to be modulated by said modulator, and (9) a transmitter transmitting a modulated carrier wave from said modulator.

2. The timepiece apparatus as claimed in claim 1, wherein a transmitting antenna is provided at a transmission terminal of said transmitter.

3. The timepiece apparatus as claimed in claim 1, wherein said segment video signal generator is composed of a position detecting circuit receiving said synchronizing signal from said synchronizing signal generator, a wave form shaping circuit receiving a detection signal from said position detecting circuit, and a gate circuit receiving each output from said wave form shaping circuit and said decoder so as to deliver said segment video signal to said modulator.

4. The timepiece apparatus as claimed in claim 1, wherein said segment video signal generator comprises one shot multivibrators connected in cascade with the output from said synchronizing signal generator.

5. The timepiece apparatus as claimed in claim 1, wherein said segment video signal generator comprises a counter connected to said synchronizing signal generator and a read only memory connected through said voltage comparing device to said counter.

6. The timepiece apparatus as claimed in claim 3, wherein said position detector is composed of a saw tooth wave generator receiving said synchronizing signal, and a plurality of voltage comparing devices receiving the output signal from said saw tooth wave generator and having different voltage value.

7. The timepiece apparatus as claimed in claim 3, wherein said wave form shaping circuit is composed of a differentiation circuit.

8. The timepiece apparatus as claimed in claim 3, wherein said gate circuit comprises a plurality of AND gates and an OR gate receiving all the outputs from the AND gates.

9. The timepiece apparatus as claimed in claim 3, wherein said modulator comprises a video signal synthesizer synthesizing each output from said segment video signal generator and said synchronizing signal generator.

10. The timepiece apparatus as claimed in claim 1, wherein said segment video signal generator connected with said modulator delivers a mark video signal together with said segment video signal to said modulator and an externally actuated member provided at said segment video signal generator for controlling said segment video signal generator so as to determine whether or not a desired mark is displayed.

* * * * *